US012800542B2

(12) United States Patent
Watanabe et al.

(10) Patent No.: US 12,800,542 B2
(45) Date of Patent: Nov. 17, 2026

(54) GAS SENSOR AND CONCENTRATION MEASUREMENT METHOD USING GAS SENSOR

(71) Applicant: NGK INSULATORS, LTD., Nagoya (JP)

(72) Inventors: Yusuke Watanabe, Nagoya (JP); Daichi Ichikawa, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 37 days.

(21) Appl. No.: 19/098,013

(22) Filed: Apr. 2, 2025

(65) Prior Publication Data

US 2025/0258128 A1 Aug. 14, 2025

Related U.S. Application Data

(63) Continuation of application No. PCT/JP2023/030302, filed on Aug. 23, 2023.

(30) Foreign Application Priority Data

Oct. 6, 2022 (JP) ................................ 2022-161651

(51) Int. Cl.
*G01N 27/407* (2006.01)
*G01N 27/27* (2006.01)
(Continued)

(52) U.S. Cl.
CPC ........... *G01N 27/407* (2013.01); *G01N 27/27* (2013.01); *G01N 27/301* (2013.01); *G01N 27/605* (2013.01)

(58) Field of Classification Search
CPC .... G01N 27/27; G01N 27/41; G01N 27/4114; G01N 27/4074; G01N 27/417;
(Continued)

(56) References Cited

U.S. PATENT DOCUMENTS

2003/0164023 A1 9/2003 Gruenwald et al.
2004/0112765 A1 6/2004 Alkemade et al.
(Continued)

FOREIGN PATENT DOCUMENTS

JP 2004-518150 A 6/2004
JP 2004-519694 A 7/2004
(Continued)

OTHER PUBLICATIONS

Unexamined U.S. Appl. No. 19/098,027, filed Apr. 2, 2025.
International Search Report of PCT/JP2023/030302 dated Sep. 26, 2023.

*Primary Examiner* — Gurpreet Kaur
(74) *Attorney, Agent, or Firm* — MATTINGLY & MALUR, PC

(57) ABSTRACT

An adjustment pump cell performs first pumping-out operation to pump out oxygen so that all $H_2O$ and $CO_2$ in a measurement gas introduced into a first chamber are reduced, a first measurement pump cell selectively oxidizes $H_2$ in a second chamber, a second measurement pump cell oxidizes CO in a third chamber, a concentration of $H_2O$ and $CO_2$ are identified based on currents generated in respective oxidization, the adjustment pump cell can further perform second pumping-out operation to pump out oxygen from the first chamber to the extent that $H_2O$ and $CO_2$ are not reduced in the middle of the first pumping-out operation, and reduction of $H_2O$ and $CO_2$ in the first chamber is interrupted upon start of the second pumping-out operation, so that $H_2O$ and $CO_2$ generated in the second chamber or the third chamber are emitted outside an element.

18 Claims, 8 Drawing Sheets

(51) Int. Cl.
*G01N 27/30* (2006.01)
*G01N 27/60* (2006.01)

(58) Field of Classification Search
CPC .. G01N 27/301; G01N 27/407; G01N 27/409; G01N 27/519; G01N 27/605
See application file for complete search history.

(56) References Cited

U.S. PATENT DOCUMENTS

| | | | |
|---|---|---|---|
| 2015/0034484 | A1 | 2/2015 | Nakasone et al. |
| 2015/0293052 | A1 | 10/2015 | Reinhardt et al. |
| 2016/0216229 | A1 | 7/2016 | Okamoto et al. |
| 2016/0223487 | A1 | 8/2016 | Okamoto et al. |

FOREIGN PATENT DOCUMENTS

| | | | |
|---|---|---|---|
| JP | 2015-031604 | A | 2/2015 |
| JP | 2015-534081 | A | 11/2015 |
| JP | 5918177 | B2 | 5/2016 |
| JP | 2016-138775 | A | 8/2016 |
| JP | 6469462 | B2 | 2/2019 |
| JP | 6469464 | B2 | 2/2019 |
| JP | 2020-067432 | A | 4/2020 |

GAS SENSOR AND CONCENTRATION MEASUREMENT METHOD USING GAS SENSOR

CROSS-REFERENCE TO RELATED APPLICATION

This application is a continuation application of PCT/JP2023/030302, filed on Aug. 23, 2023, which claims the benefit of priority of Japanese Patent Application No. JP2022-161651, filed on Oct. 6, 2022, the entire contents of which are incorporated herein by reference.

BACKGROUND

Technical Field

The present invention relates to a multi-gas sensor capable of sensing a plurality of types of sensing target gas components and measuring concentrations thereof.

Description of the Background Art

In measurement for managing the amount of an emitted exhaust gas from a vehicle, technology of measuring concentrations of water vapor ($H_2O$) and carbon dioxide ($CO_2$) has already been known (see Japanese Patent No. 5918177, No. 6469464, and No. 6469462, for example). In each of gas sensors disclosed in Japanese Patent No. 5918177 and No. 6469464, a water vapor ($H_2O$) component and a carbon dioxide ($CO_2$) component can be measured in parallel. As for a gas sensor disclosed in Japanese Patent No. 6469462, a water vapor ($H_2O$) component can accurately be measured even when a measurement gas contains carbon dioxide ($CO_2$).

A carbon dioxide detection device in which an air-fuel ratio detection electrode and a carbon dioxide detection electrode are arranged in parallel and which can measure a concentration of carbon dioxide while making a correction taking into account the influence of an air-fuel ratio using currents flowing between the respective electrodes and a reference electrode and can further make a correction taking into account the influence of a concentration of water has also already been known (see Japanese Patent Application Laid-Open No. 2020-67432, for example).

In the gas sensor disclosed in Japanese Patent No. 5918177 having a three-chamber configuration, firstly, a main pump cell as a pump cell for a first internal space operates to pump out $O_2$ contained in a measurement gas introduced into the first internal space and to reduce all $H_2O$ and $CO_2$ similarly contained in the measurement gas once to generate $H_2$ and CO. The measurement gas containing these $H_2$ and CO is introduced into a second internal space and further into a third internal space. A first measurement pump cell as a pump cell for the second internal space then pumps in $O_2$ to selectively oxidize $H_2$ to generate $H_2O$, and, further, a second measurement pump cell as a pump cell for the third internal space pumps in $O_2$ to oxidize CO to generate $CO_2$. Concentrations of $H_2O$ and $CO_2$ in the measurement gas are respectively measured based on magnitudes of pump currents flowing through the first measurement pump cell and the second measurement pump cell when $H_2$ and CO are oxidized.

Generated $H_2O$ and $CO_2$ basically reside in the second internal space and the third internal space. However, it has been found that, as measurement is continued, $H_2O$ and $CO_2$ can flow back to the first internal space and be reduced again, and $H_2$ and CO generated by re-reduction can be oxidized again by pumping of oxygen into the second internal space and the third internal space by the first measurement pump cell and the second measurement pump cell.

Such a phenomenon is not preferable because currents associated with re-oxidation are superimposed onto pump currents flowing through the first measurement pump cell and the second measurement pump cell depending on the amount of $H_2O$ and $CO_2$ contained in the measurement gas, so that measurement accuracy of the gas sensor according to Japanese Patent No. 5918177 in which the concentrations of $H_2O$ and $CO_2$ are measured based on magnitudes of the pump currents is reduced.

In a gas sensor disclosed in Japanese Patent Application Laid-Open No. 2020-67432, carbon dioxide is decomposed into carbon and oxygen by a carbon dioxide detection cell, while electromotive force in an air-fuel ratio detection cell is controlled to have a constant value in accordance with an oxygen concentration of an exhaust gas, but, in the gas sensor, CO and oxygen generated by the carbon dioxide detection cell might react in the air-fuel ratio detection cell, which adjusts the oxygen concentration, to generate $CO_2$, and $CO_2$ might be repeatedly sensed by the carbon dioxide detection cell to reduce measurement accuracy.

SUMMARY

The present invention relates to a multi-gas sensor capable of sensing a plurality of types of sensing target gas components and measuring concentrations thereof.

According to the present invention, a gas sensor capable of measuring concentrations of a plurality of sensing target gas components contained in a measurement gas, the measurement gas at least containing water vapor and carbon dioxide, the gas sensor includes: a sensor element having a structure formed of an oxygen-ion conductive solid electrolyte; and a controller controlling operation of the gas sensor, wherein the sensor element includes: a gas inlet through which the measurement gas is introduced; a plurality of chambers communicating sequentially from the gas inlet via different diffusion control parts; and a heater heating the sensor element, two of the plurality of chambers are a first measurement chamber and a second measurement chamber, the second measurement chamber being one of the plurality of chambers farthest from the gas inlet, the first measurement chamber being a chamber next to the second measurement chamber, the sensor element further includes: an oxygen pumping-out means capable of performing first pumping-out operation to pump out oxygen contained in the measurement gas so that substantially all water vapor and carbon dioxide contained in the measurement gas are reduced before the measurement gas introduced through the gas inlet reaches the first measurement chamber; a first measurement pump cell including a first measurement electrode formed to face the first measurement chamber, an out-of-space pump electrode provided at a location other than a location in the plurality of chambers, and a portion of the solid electrolyte present between the first measurement electrode and the out-of-space pump electrode; and a second measurement pump cell including a second measurement electrode formed to face the second measurement chamber, the out-of-space pump electrode, and a portion of the solid electrolyte present between the second measurement electrode and the out-of-space pump electrode, the first measurement pump cell is capable of pumping oxygen into the first measurement chamber to selectively oxidize, in the first measurement chamber, hydrogen generated by reduction of water vapor associated with the first pumping-out operation and contained in the measurement gas introduced into the first measurement chamber, the second measurement pump cell is capable of pumping oxygen into the second measurement chamber to oxidize, in the second measurement chamber, carbon monoxide generated by reduction of carbon dioxide associated with the first pumping-out operation and contained in the measurement gas introduced into the second measurement chamber, the controller identifies: a concentration of water vapor contained in the measurement gas based on a magnitude of a current flowing between the first measurement electrode and the out-of-space pump electrode when oxygen is pumped into the first measurement chamber by the first measurement pump cell; and a concentration of carbon dioxide contained in the measurement gas based on a magnitude of a current flowing between the second measurement electrode and the out-of-space pump electrode when oxygen is pumped into the second measurement chamber by the second measurement pump cell, the oxygen pumping-out means is further capable of performing second pumping-out operation for a predetermined time period in the middle of the first pumping-out operation, the second pumping-out operation being operation to pump out oxygen contained in the measurement gas to the extent that water vapor and carbon dioxide contained in the measurement gas before reaching the first measurement chamber are not reduced, and reduction of water vapor and carbon dioxide by the oxygen pumping-out means is interrupted upon start of the second pumping-out operation, so that water vapor generated in the first measurement chamber and carbon dioxide generated in the second measurement chamber are emitted outside the sensor element.

Another aspect of the present invention is a concentration measurement method of measuring concentrations of a plurality of sensing target gas components contained in a measurement gas using a gas sensor, the measurement gas at least containing water vapor and carbon dioxide, wherein the gas sensor includes a sensor element having a structure formed of an oxygen-ion conductive solid electrolyte, the sensor element includes: a gas inlet through which the measurement gas is introduced; a plurality of chambers communicating sequentially from the gas inlet via different diffusion control parts; and a heater heating the sensor element, two of the plurality of chambers are a first measurement chamber and a second measurement chamber, the second measurement chamber being one of the plurality of chambers farthest from the gas inlet, the first measurement chamber being a chamber next to the second measurement chamber, the sensor element further includes: an oxygen pumping-out means capable of performing first pumping-out operation to pump out oxygen contained in the measurement gas so that substantially all water vapor and carbon dioxide contained in the measurement gas are reduced before the measurement gas introduced through the gas inlet reaches the first measurement chamber; a first measurement pump cell including a first measurement electrode formed to face the first measurement chamber, an out-of-space pump electrode provided at a location other than a location in the plurality of chambers, and a portion of the solid electrolyte present between the first measurement electrode and the out-of-space pump electrode; and a second measurement pump cell including a second measurement electrode formed to face the second measurement chamber, the out-of-space pump electrode, and a portion of the solid electrolyte present between the second measurement electrode and the out-of-space pump electrode, the concentration measurement method using the gas sensor includes: a) performing the first pumping-out operation using the oxygen pumping-out means; b) pumping, using the first measurement pump cell, oxygen into the first measurement chamber to selectively oxidize, in the first measurement chamber, hydrogen generated by reduction of water vapor associated with the first pumping-out operation and contained in the measurement gas introduced into the first measurement chamber; c) pumping, using the second measurement pump cell, oxygen into the second measurement chamber to oxidize, in the second measurement chamber, carbon monoxide generated by reduction of carbon dioxide associated with the first pumping-out operation and contained in the measurement gas introduced into the second measurement chamber; d) identifying a concentration of water vapor contained in the measurement gas based on a magnitude of a current flowing between the first measurement electrode and the out-of-space pump electrode when oxygen is pumped into the first measurement chamber using the first measurement pump cell; and e) identifying a concentration of carbon dioxide contained in the measurement gas based on a magnitude of a current flowing between the second measurement electrode and the out-of-space pump electrode when oxygen is pumped into the second measurement chamber using the second measurement pump cell, the oxygen pumping-out means performs second pumping-out operation to pump out oxygen contained in the measurement gas to the extent that water vapor and carbon dioxide contained in the measurement gas before reaching the first measurement chamber are not reduced for a predetermined time period in the middle of the step a) to interrupt reduction of water vapor and carbon dioxide using the oxygen pumping-out means, so that water vapor generated in the first measurement chamber and carbon dioxide generated in the second measurement chamber are emitted outside the sensor element.

According to the present invention, reduction in measurement accuracy of a gas sensor attributable to re-reduction of water vapor and carbon dioxide generated by oxidation of hydrogen and carbon monoxide is suitably suppressed.

It is therefore an object of the present invention to provide a gas sensor suitably suppressing reduction in measurement accuracy attributable to the presence of a substance generated upon concentration measurement.

DESCRIPTION OF THE PREFERRED EMBODIMENTS

<Configuration of Gas Sensor>

Figure 1:
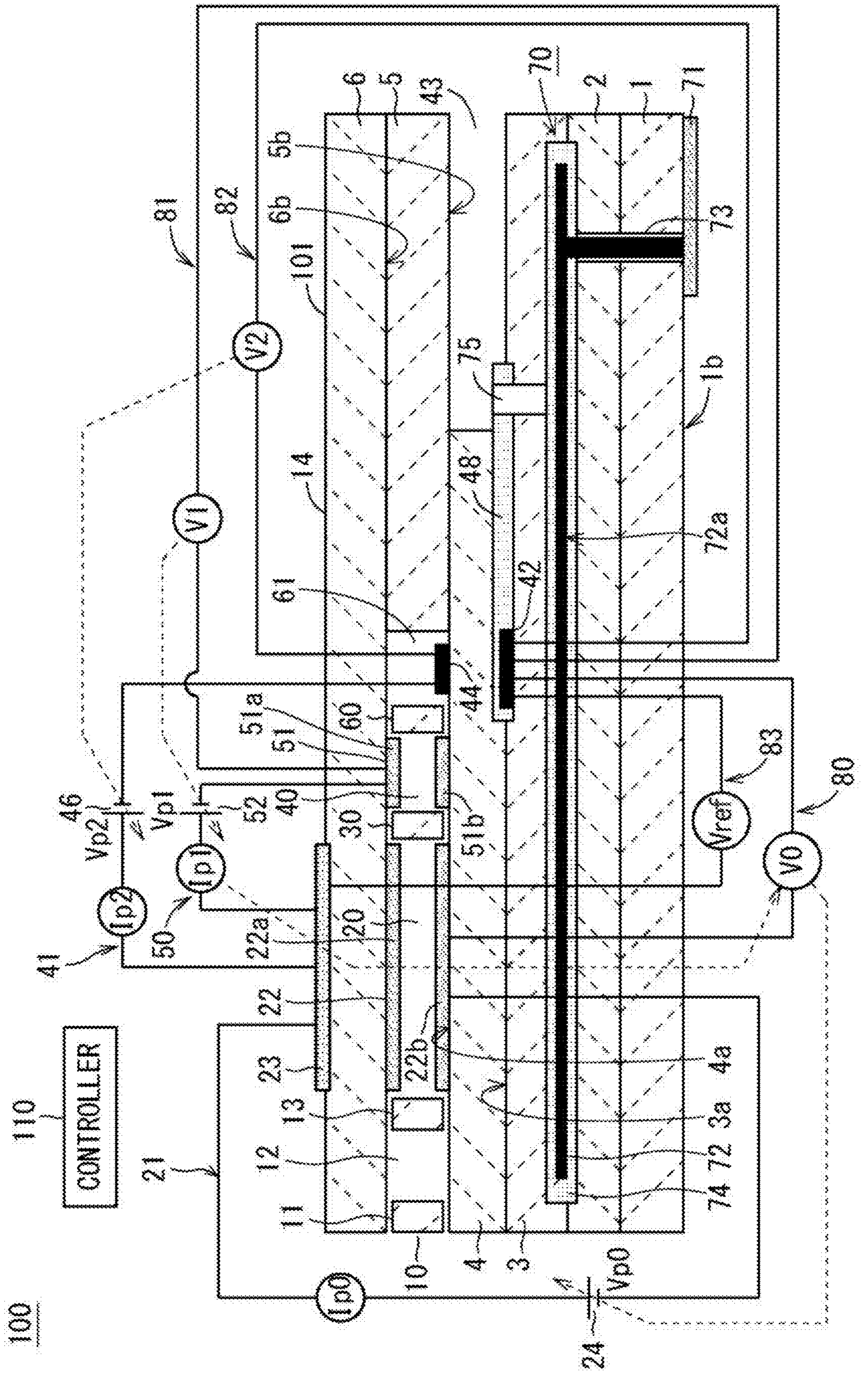
FIG. 1 is a diagram schematically showing one example of a configuration of a gas sensor 100.

FIG. 1 is a diagram schematically showing one example of a configuration of a gas sensor 100 according to the present embodiment. The gas sensor 100 is a multi-gas sensor sensing a plurality of types of gas components and measuring concentrations thereof using a sensor element 101. Assume that at least water vapor ($H_2O$) and carbon dioxide ($CO_2$) are main sensing target gas components of the gas sensor 100 in the present embodiment. The gas sensor 100 is attached to an exhaust path of an internal combustion engine, such as an engine of a vehicle, and is used with an exhaust gas flowing along the exhaust path as a measurement gas, for example. FIG. 1 includes a vertical cross-sectional view taken along a longitudinal direction of the sensor element 101.

The sensor element 101 includes an elongated planar structure (base part) 14 formed of an oxygen-ion conductive solid electrolyte, a first diffusion control part 11 doubling a gas inlet 10 which is formed in one end portion (a left end portion in the figure) of the structure 14 and through which the measurement gas is introduced, and a buffer space 12, a first chamber 20, a second chamber 40, and a third chamber 61 formed in the structure 14 and communicating sequentially from the gas inlet 10 (first diffusion control part 11). The buffer space 12 communicates with the gas inlet 10 (first diffusion control part 11). The first chamber 20 communicates with the buffer space 12 via a second diffusion control part 13. The second chamber 40 communicates with the first chamber 20 via a third diffusion control part 30. The third chamber 61 communicates with the second chamber 40 via a fourth diffusion control part 60.

The structure 14 is formed by laminating a plurality of substrates of ceramics, for example. Specifically, the structure 14 has a configuration in which six layers including a first substrate 1, a second substrate 2, a third substrate 3, a first solid electrolyte layer 4, a spacer layer 5, and a second solid electrolyte layer 6 are sequentially laminated from the bottom. Each layer is formed of an oxygen-ion conductive solid electrolyte, such as zirconia ($ZrO_2$).

The first diffusion control part 11 doubling as the gas inlet 10, the buffer space 12, the second diffusion control part 13, the first chamber 20, the third diffusion control part 30, the second chamber 40, the fourth diffusion control part 60, and the third chamber 61 are formed in this order between a lower surface 6*b* of the second solid electrolyte layer 6 and an upper surface 4*a* of the first solid electrolyte layer 4 on a side of the one end portion of the structure 14. A part extending from the gas inlet 10 to the third chamber 61 is also referred to as a gas distribution part.

The buffer space 12, the first chamber 20, the second chamber 40, and the third chamber 61 are formed to penetrate the spacer layer 5 in a thickness direction. The lower surface 6*b* of the second solid electrolyte layer 6 is exposed in upper portions in the figure of these chambers and the like, and the upper surface 4*a* of the first solid electrolyte layer 4 is exposed in lower portions in the figure of these chambers and the like. Side portions of these chambers and the like are each defined by the spacer layer 5 or any of the diffusion control parts. The first chamber 20, the second chamber 40, and the third chamber 61 each have a length (size in the longitudinal direction of the element) of 0.3 mm to 1.0 mm, for example, a width (size in a transverse direction of the element) of 0.5 mm to 30 mm, for example, and a height (size in a thickness direction of the element) of 50 μm to 200 μm, for example. These chambers, however, are not required to have the same size and may have different sizes.

The gas inlet 10 may similarly be formed to penetrate the spacer layer 5 in the thickness direction separately from the first diffusion control part 11. In this case, the first diffusion control part 11 is to be formed inside and adjacent to the gas inlet 10.

The first diffusion control part 11, the second diffusion control part 13, the third diffusion control part 30, and the fourth diffusion control part 60 each include two horizontally long slits. That is to say, they each have openings elongated in a direction perpendicular to the page of the figure in an upper portion and a lower portion in the figure thereof. The slits each have a length (size in the longitudinal direction of the element) of 0.2 mm to 1.0 mm, for example, a width of an opening (size in the transverse direction of the element) of 0.5 mm to 30 mm, for example, and a height of the opening (size in the thickness direction of the element) of 5 μm to 30 μm, for example.

The sensor element 101 includes a reference gas introduction space 43 in the other end portion (a right end portion in the figure) opposite the one end portion in which the gas inlet 10 is provided. The reference gas introduction space 43 is formed between an upper surface 3*a* of the third substrate 3 and a lower surface 5*b* of the spacer layer 5. A side portion of the reference gas introduction space 43 is defined by a side surface of the first solid electrolyte layer 4. Oxygen ($O_2$) and air are introduced into the reference gas introduction space 43 as reference gases, for example.

The gas inlet 10 (first diffusion control part 11) is a part opening to an external space, and the measurement gas is taken from the external space into the sensor element 101 through the gas inlet 10.

The first diffusion control part 11 is a part providing predetermined diffusion resistance to the taken measurement gas.

The buffer space 12 is provided to cancel concentration fluctuations of the measurement gas caused by pressure fluctuations of the measurement gas in the external space. Pulsation of exhaust pressure of the exhaust gas of the vehicle is taken as an example of such pressure fluctuations of the measurement gas, for example.

The second diffusion control part 13 is a part providing predetermined diffusion resistance to the measurement gas introduced from the buffer space 12 into the first chamber 20.

The first chamber 20 is provided as a space to pump oxygen out of the measurement gas introduced through the second diffusion control part 13 and further reduce (decompose) $H_2O$ and $CO_2$ upon pumping-out to generate hydrogen ($H_2$) and carbon monoxide (CO), so that the measurement gas does not substantially contain oxygen, $H_2O$, and $CO_2$. Pumping-out of oxygen is implemented by operation of an adjustment pump cell 21.

The adjustment pump cell 21 is an electrochemical pump cell including an inner pump electrode (adjustment electrode) 22, an outer pump electrode (out-of-space pump electrode) 23, and a solid electrolyte present in a portion of the structure 14 sandwiched between these electrodes.

In the adjustment pump cell 21, a voltage Vp0 is applied across the inner pump electrode 22 and the outer pump electrode 23 from a variable power supply 24 disposed outside the sensor element 101 to generate an oxygen pump current (oxygen ion current) Ip0. Oxygen in the first chamber 20 can thereby be pumped out to the external space. Assume that a direction of the oxygen pump current Ip0 when oxygen is pumped out from the first chamber 20 is a positive direction of the oxygen pump current Ip0 in the present embodiment.

The inner pump electrode 22 is provided on substantially the entire portions of the lower surface 6*b* of the second solid electrolyte layer 6 and the upper surface 4*a* of the first solid electrolyte layer 4 defining the first chamber 20 respectively as a ceiling electrode portion 22*a* and a bottom electrode portion 22*b*. The ceiling electrode portion 22*a* and the bottom electrode portion 22*b* are connected by an unillustrated conducting portion.

The inner pump electrode 22 is provided as a porous cermet electrode containing at least one of platinum and rhodium (Rh) as a metal component and being rectangular in plan view.

The outer pump electrode 23 is provided, with platinum or an alloy (a Pt—Au alloy) of platinum and gold as a metal component, as a porous cermet electrode containing platinum or the Pt—Au alloy and zirconia and being rectangular in plan view, for example.

In the sensor element 101, the inner pump electrode 22, a reference electrode 42, and a solid electrolyte present in a portion of the structure 14 sandwiched between these electrodes constitute a first chamber sensor cell 80. The first chamber sensor cell 80 is an electrochemical sensor cell to grasp oxygen partial pressure in an atmosphere in the first chamber 20.

The reference electrode 42 is an electrode formed between the first solid electrolyte layer 4 and the third substrate 3 and is provided as a porous cermet electrode containing platinum and zirconia and being rectangular in plan view, for example.

A reference gas introduction layer 48 formed of porous alumina and leading to the reference gas introduction space 43 is provided around the reference electrode 42. A reference gas in the reference gas introduction space 43 is introduced into a surface of the reference electrode 42 via the reference gas introduction layer 48. That is to say, the reference electrode 42 is always in contact with the reference gas.

In the first chamber sensor cell 80, electromotive force (Nernst electromotive force) V0 is generated between the inner pump electrode 22 and the reference electrode 42. The electromotive force V0 has a value in accordance with a difference between an oxygen concentration (oxygen partial pressure) in the first chamber 20 and an oxygen concentration (oxygen partial pressure) of the reference gas. The oxygen concentration (oxygen partial pressure) of the reference gas is basically constant, so that the electromotive force V0 has a value in accordance with the oxygen concentration (oxygen partial pressure) in the first chamber 20.

The third diffusion control part 30 is a part providing predetermined diffusion resistance to the measurement gas introduced from the first chamber 20 into the second chamber 40 and substantially not containing oxygen, $H_2O$ and $CO_2$.

The second chamber 40 is provided as a space to selectively oxidize all of $H_2$ from among $H_2$ and CO contained in the measurement gas introduced through the third diffusion control part 30 to generate $H_2O$ again. Generation of $H_2O$ by oxidation of $H_2$ is implemented by operation of a first measurement pump cell 50.

The first measurement pump cell 50 is an electrochemical pump cell including a first measurement electrode 51, the outer pump electrode 23, and a solid electrolyte present in a portion of the structure 14 sandwiched between these electrodes.

In the first measurement pump cell 50, a voltage Vp1 is applied across the first measurement electrode 51 and the outer pump electrode 23 from a variable power supply 52 disposed outside the sensor element 101 to generate an oxygen pump current (oxygen ion current) Ip1. Oxygen can thereby be pumped into the second chamber 40 from the external space. Assume that a direction of the oxygen pump current Ip1 when oxygen is pumped out from the second chamber 40 is a positive direction of the oxygen pump current Ip1 in the present embodiment.

The first measurement electrode 51 is provided on substantially the entire portions of the lower surface 6*b* of the second solid electrolyte layer 6 and the upper surface 4*a* of the first solid electrolyte layer 4 defining the second chamber 40 respectively as a ceiling electrode portion 51*a* and a bottom electrode portion 51*b*. The ceiling electrode portion 51*a* and the bottom electrode portion 51*b* are connected by an unillustrated conducting portion.

The first measurement electrode 51 is provided, with the Pt—Au alloy as a metal component, as a porous cermet electrode containing the Pt—Au alloy and zirconia and being rectangular in plan view, for example. The Pt—Au alloy preferably has an Au concentration of 1 wt % or more and 50 wt % or less and more preferably has an Au concentration of 10 wt % or more and 30 wt % or less. In this case, a selective $H_2$ oxidation property, that is, a property that, when $H_2$ and CO coexist in the second chamber 40, only $H_2$ is selectively oxidized with oxygen pumped in by the first measurement pump cell 50 and CO is not oxidized, of the first measurement electrode 51 is more suitably developed.

In the sensor element 101, the first measurement electrode 51, the reference electrode 42, and a solid electrolyte present in a portion of the structure 14 sandwiched between these electrodes constitute a second chamber sensor cell 81. The second chamber sensor cell 81 is an electrochemical sensor cell to grasp oxygen partial pressure in an atmosphere in the second chamber 40.

In the second chamber sensor cell 81, electromotive force (Nernst electromotive force) V1 is generated between the first measurement electrode 51 and the reference electrode 42. The electromotive force V1 has a value in accordance with a difference between an oxygen concentration (oxygen partial pressure) in the second chamber 40 and the oxygen concentration (oxygen partial pressure) of the reference gas. Since the oxygen concentration (oxygen partial pressure) of the reference gas is basically constant, the electromotive force V1 has a value in accordance with the oxygen concentration (oxygen partial pressure) in the second chamber 40.

The fourth diffusion control part 60 is a part providing predetermined diffusion resistance to the measurement gas introduced from the second chamber 40 into the third chamber 61 and containing $H_2O$ and CO while substantially not containing $CO_2$ and oxygen.

The third chamber 61 is provided as a space to oxidize all of CO contained in the measurement gas introduced through the fourth diffusion control part 60 to generate $CO_2$ again. Generation of $CO_2$ by oxidation of CO is implemented by operation of a second measurement pump cell 41.

The second measurement pump cell 41 is an electrochemical pump cell including a second measurement electrode 44, the outer pump electrode 23, and a solid electrolyte present in a portion of the structure 14 sandwiched between these electrodes.

In the second measurement pump cell 41, a voltage Vp2 is applied across the second measurement electrode 44 and the outer pump electrode 23 from a variable power supply 46 disposed outside the sensor element 101 to generate an oxygen pump current (oxygen ion current) Ip2. Oxygen can thereby be pumped into the third chamber 61 from the external space. Assume that a direction of the oxygen pump current Ip2 when oxygen is pumped out from the third chamber 61 is a positive direction of the oxygen pump current Ip2 in the present embodiment.

The second measurement electrode 44 is provided on substantially the entire portion of the upper surface 4*a* of the first solid electrolyte layer 4 defining the third chamber 61.

The second measurement electrode 44 is provided, with Pt as a metal component, as a porous cermet electrode containing Pt and zirconia and being rectangular in plan view, for example.

In the sensor element 101, the second measurement electrode 44, the reference electrode 42, and a solid electrolyte present in a portion of the structure 14 sandwiched between these electrodes constitute a third chamber sensor cell 82. The third chamber sensor cell 82 is an electrochemical sensor cell to grasp oxygen partial pressure in an atmosphere in the third chamber 61.

In the third chamber sensor cell 82, electromotive force (Nernst electromotive force) V2 is generated between the second measurement electrode 44 and the reference electrode 42. The electromotive force V2 has a value in accordance with a difference between an oxygen concentration (oxygen partial pressure) in the third chamber 61 and the oxygen concentration (oxygen partial pressure) of the reference gas. Since the oxygen concentration (oxygen partial pressure) of the reference gas is basically constant, the electromotive force V2 has a value in accordance with the oxygen concentration (oxygen partial pressure) in the third chamber 61.

The sensor element 101 further includes an electrochemical sensor cell 83 including the outer pump electrode 23, the reference electrode 42, and a solid electrolyte present in a portion of the structure 14 sandwiched between these electrodes. Electromotive force Vref generated between the outer pump electrode 23 and the reference electrode 42 of the sensor cell 83 has a value in accordance with oxygen partial pressure of the measurement gas present outside the sensor element 101.

In addition to the foregoing, the sensor element 101 includes a heater part 70 playing a role in temperature adjustment of heating the sensor element 101 and maintaining the temperature thereof to enhance oxygen ion conductivity of the solid electrolyte forming the structure 14.

The heater part 70 mainly includes a heater electrode 71, a heater element 72, a heater lead 72*a*, a through hole 73, a heater insulating layer 74, and a heater resistance detection lead, which is not illustrated in FIG. 1. The heater element 72 is hereinafter also simply referred to as a heater 72.

The heater 72 is provided to be sandwiched between the second substrate 2 and the third substrate 3 from below and above and generates heat by being powered from outside through the heater electrode 71 provided on a lower surface 1*b* of the first substrate 1, the through hole 73, and the heater lead 72*a*. The heater 72 is buried over the entire region of a range from the buffer space 12 to the third chamber 61 and can heat the sensor element 101 to a predetermined temperature and, further, maintain the temperature.

The heater 72 is provided so that a temperature is highest near the first chamber 20 (near the adjustment electrode 22) and decreases with increasing distance from the first chamber 20 in the longitudinal direction of the element during heating. In the present embodiment, a temperature in a range from the one end portion of the sensor element 101 in which the gas inlet 10 is disposed to the third chamber 61 when the gas sensor 100 is in use (when the sensor element 101 is driven) is referred to as an element driving temperature. The heater 72 performs heating so that the element driving temperature is in a range of 750° C. to 950° C.

The heater insulating layer 74 of alumina and the like is formed above and below the heater 72 to electrically insulate the heater 72 from the second substrate 2 and the third substrate 3. The heater part 70 also includes a pressure dissipation hole 75. The pressure dissipation hole 75 is a part provided to penetrate the third substrate 3 and communicate with the reference gas introduction space 43 and is provided to mitigate a rise in internal pressure associated with a rise in temperature in the heater insulating layer 74.

The gas sensor 100 further includes a controller 110 controlling operation of the sensor element 101 and performing processing to identify concentrations of the sensing target gas components based on currents flowing through the sensor element 101.

Figure 2:
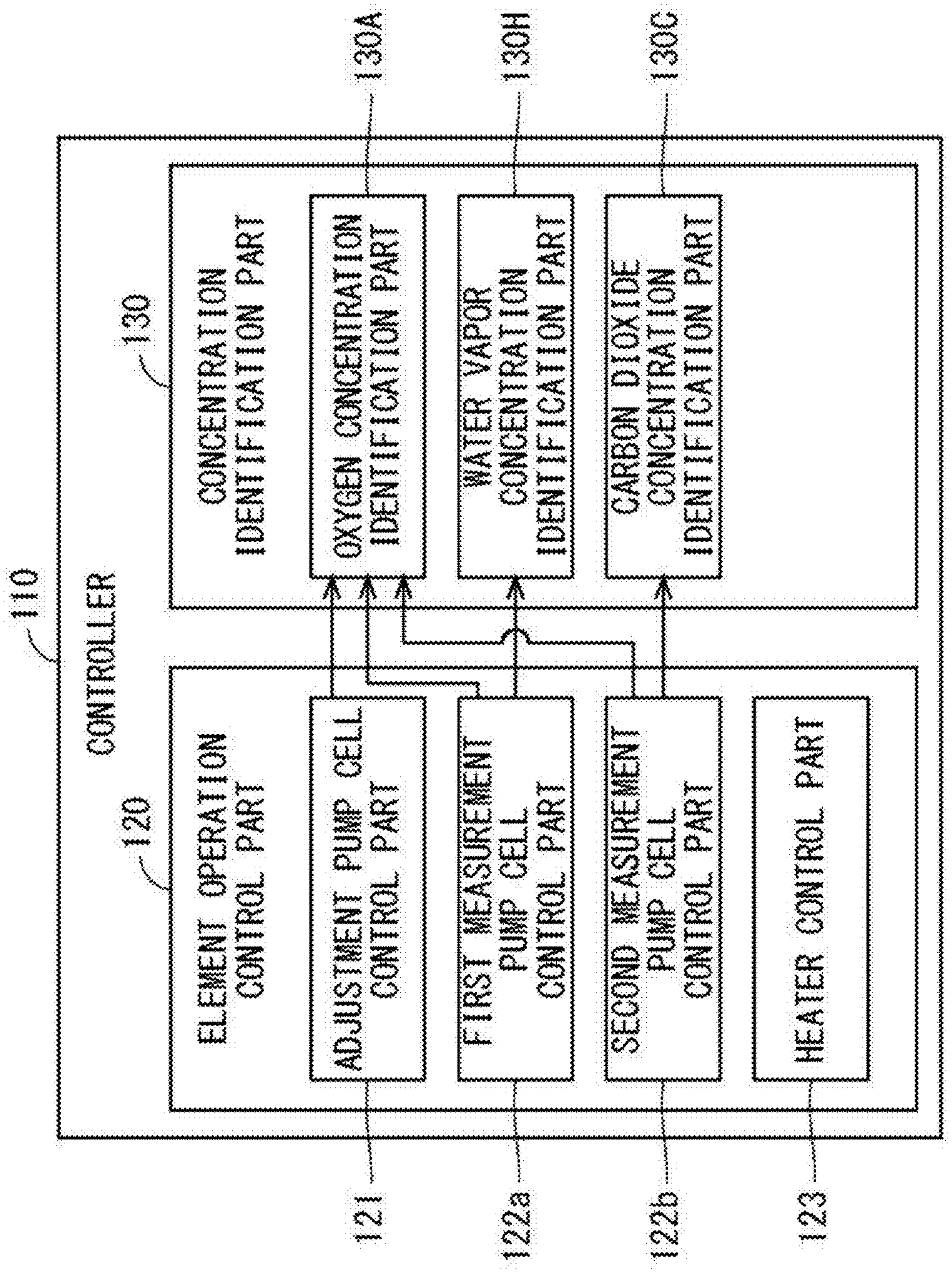
FIG. 2 is a block diagram showing functional components implemented by a controller 110.

FIG. 2 is a block diagram showing functional components implemented by the controller 110. The controller 110 is configured by one or more electronic circuits including one or more central processing units (CPUs), a storage device, and the like, for example. Each of the electronic circuits is a software functional part implementing a predetermined functional component by a CPU executing a predetermined program stored in the storage device, for example. The controller 110 may naturally be configured by an integrated circuit, such as a field-programmable gate array (FPGA), on which a plurality of electronic circuits are connected in accordance with their functions and the like.

When the gas sensor 100 is attached to the exhaust path of the engine of the vehicle and is used with the exhaust gas flowing along the exhaust path as the measurement gas, some or all of functions of the controller 110 may be implemented by an electronic control unit (ECU) of the vehicle.

The controller 110 includes, as functional components implemented by the CPU executing a predetermined program, an element operation control part 120 controlling operation of each part of the sensor element 101 described above and a concentration identification part 130 performing processing to identify the concentrations of the sensing target gas components contained in the measurement gas.

The element operation control part 120 mainly includes an adjustment pump cell control part 121 controlling operation of the adjustment pump cell 21, a first measurement pump cell control part 122*a* controlling operation of the first measurement pump cell 50, a second measurement pump cell control part 122*b* controlling operation of the second measurement pump cell 41, and a heater control part 123 controlling heating operation performed by the heater 72.

On the other hand, the concentration identification part 130 mainly includes a water vapor concentration identification part 130H and a carbon dioxide concentration identification part 130C respectively identifying a concentration of $H_2O$ and a concentration of $CO_2$ as the main sensing target gas components of the gas sensor 100.

The water vapor concentration identification part 130H identifies the concentration of $H_2O$ contained in the measurement gas based on a value of the oxygen pump current Ip1 flowing through the first measurement pump cell 50 acquired by the first measurement pump cell control part 122*a*.

The carbon dioxide concentration identification part 130C identifies the concentration of $CO_2$ contained in the measurement gas based on a value of the oxygen pump current Ip2 flowing through the second measurement pump cell 41 acquired by the second measurement pump cell control part 122*b*.

The concentration identification part 130 further includes an oxygen concentration identification part 130A identifying a concentration of oxygen contained in the measurement gas. The oxygen concentration identification part 130A identifies the concentration of oxygen contained in the measurement gas based on a value of the oxygen pump current Ip0 flowing through the adjustment pump cell 21 acquired by the adjustment pump cell control part 121, the value of the oxygen pump current Ip1 flowing through the first measurement pump cell 50 acquired by the first measurement pump cell control part 122*a*, and the value of the oxygen pump current Ip2 flowing through the second measurement pump cell 41 acquired by the second measurement pump cell control part 122*b*. That is to say, the gas sensor 100 according to the present embodiment senses, in addition to $H_2O$ and $CO_2$ as the main sensing target gas components, oxygen as an appendant sensing target gas component.

<Basic Idea of Multi-Gas Sensing and Concentration Identification>

A basic idea of sensing of a plurality of types of gases (multi-gas sensing) and identification of concentrations of the sensed gases implemented by the gas sensor 100 having a configuration as described above will be described next. Assume hereinafter that the measurement gas is an exhaust gas containing oxygen, $H_2O$, and $CO_2$.

Figure 3:
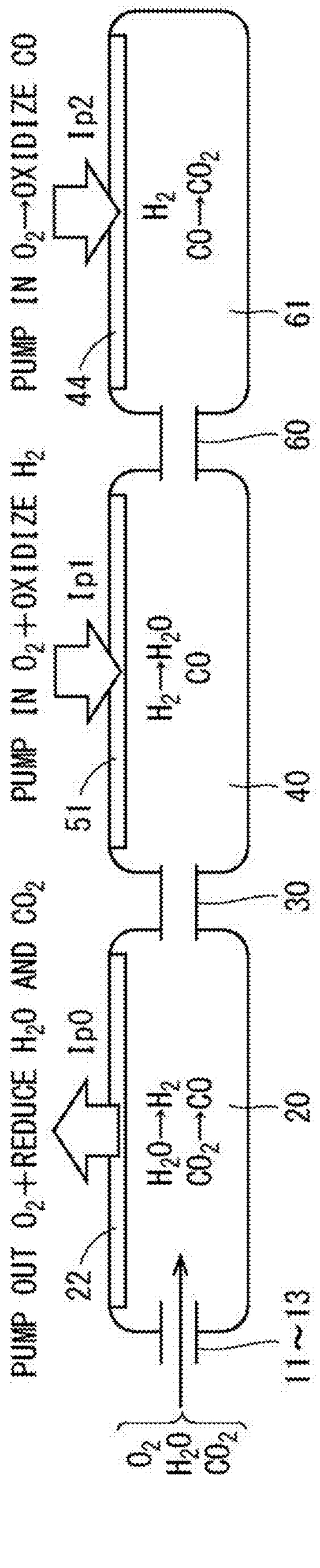
FIG. 3 is a schematic diagram illustrating basic entry and exit of gases into and from three chambers comprised in a sensor element 101 of the gas sensor 100.

FIG. 3 is a schematic diagram illustrating basic entry and exit of gases into and from the three chambers (internal spaces) comprised in the sensor element 101 of the gas sensor 100.

First, in the sensor element 101 of the gas sensor 100 according to the present embodiment, the measurement gas is introduced through the gas inlet 10 (first diffusion control part 11), the buffer space 12, and the second diffusion control part 13 into the first chamber 20 as described above. In the first chamber 20, oxygen contained in the introduced measurement gas is pumped out, and $H_2O$ and $CO_2$ contained in the introduced measurement gas are reduced by operation of the adjustment pump cell 21. That is to say, by operation of the adjustment pump cell 21, oxygen is pumped out of the measurement introduced into the first chamber 20, and a reduction (decomposition) reaction ($2H_2O \rightarrow 2H_2+O_2$ and $2CO_2 \rightarrow 2CO+O_2$) of $H_2O$ and $CO_2$ contained in the measurement gas progresses, so that substantially all $H_2O$ and $CO_2$ are decomposed into hydrogen ($H_2$), carbon monoxide (CO), and oxygen.

Pumping-out of Oxygen and reduction (decomposition) of $H_2O$ and $CO_2$ are performed in the way that the adjustment pump cell control part 121 of the controller 110 sets a target value (control voltage) of the electromotive force V0 in the first chamber sensor cell 80 to a value in a range of 1000 mV to 1500 mV (preferably 1000 mV) and feedback-controls the voltage Vp0 applied from the variable power supply 24 to the adjustment pump cell 21 in accordance with a difference between an actual value and the target value of the electromotive force V0 so that the electromotive force V0 is maintained at the target value.

The adjustment pump cell 21 operates in this manner, so that oxygen partial pressure in the first chamber 20 is maintained at a sufficiently low value at which oxygen is considered to be substantially not present. It is approximately 10-20 atm when an equation V0=1000 mV holds true, for example. The measurement gas thus no longer substantially contains $H_2O$, $CO_2$, and oxygen.

The measurement gas containing $H_2$ and CO while not substantially containing $H_2O$, $CO_2$, and oxygen is introduced into the second chamber 40.

In the second chamber 40, oxygen is pumped in by operation of the first measurement pump cell 50, and only $H_2$ contained in the introduced measurement gas is selectively oxidized.

Pumping-in of Oxygen is performed in the way that the first measurement pump cell control part 122*a* of the controller 110 sets a target value (control voltage) of the electromotive force V1 in the second chamber sensor cell 81 to a value in a range of 250 mV to 450 mV (preferably 350 mV) and feedback-controls the voltage Vp1 applied from the variable power supply 52 to the first measurement pump cell 50 in accordance with a difference between an actual value and the target value of the electromotive force V1 so that the electromotive force V1 is maintained at the target value.

The first measurement pump cell 50 operates in this manner, so that an oxidation (a combustion) reaction $2H_2+O_2 \rightarrow 2H_2O$ is facilitated, and $H_2O$ in an amount correlating with the amount of $H_2O$ introduced through the gas inlet 10 is generated again in the second chamber 40. In the present embodiment, $H_2O$ in the correlating amount means that the amount of $H_2O$ introduced through the gas inlet 10 and the amount of $H_2O$ generated again by oxidation of $H_2$ generated by decomposition of $H_2O$ are the same or are within a certain error range allowable in terms of measurement accuracy.

The target value of the electromotive force V1 is set to the value in the range of 250 mV to 450 mV, so that oxygen partial pressure in the second chamber 40 is maintained at a value in a range in which almost all $H_2$ is oxidized but CO is not oxidized. It is approximately $10^{-7}$ atm when an equation V1=350 mV holds true, for example.

Providing the first measurement electrode 51 as the cermet electrode containing the Pt—Au alloy having an Au concentration of 1 wt % or more and 50 wt % or less as the metal component as described above also contributes to improvement in selective $H_2$ oxidation property.

In this case, the oxygen pump current Ip1 (hereinafter also referred to as a water vapor detection current Ip1) flowing through the first measurement pump cell 50 is substantially proportional to the concentration of $H_2O$ generated by combustion of $H_2$ in the second chamber 40 (there is a linear relationship between the water vapor detection current Ip1 and the concentration of generated $H_2O$). The amount of $H_2O$ generated by combustion correlates with the amount of $H_2O$ in the measurement gas decomposed once in the first chamber 20 after being introduced through the gas inlet 10. Accordingly, it can be said that sensing of $H_2O$ in the measurement gas is implemented with detection of the water vapor detection current Ip1 by the first measurement pump cell control part 122*a*. The second chamber 40 is thus also referred to as a first measurement chamber.

There is a linear relationship between the water vapor detection current Ip1 and a concentration of water vapor in the measurement gas. Data (water vapor characteristics data) indicating the linear relationship is identified in advance using model gases having known water vapor concentrations and is held in the water vapor concentration identification part 130H. In the gas sensor 100 according to the present embodiment, the water vapor concentration identification part 130H acquires the value of the water vapor detection current Ip1 detected by the first measurement pump cell control part 122*a*. The water vapor concentration identification part 130H identifies a value of a concentration of water vapor corresponding to the acquired water vapor detection current Ip1 with reference to the water vapor characteristics data. The concentration of water vapor in the measurement gas is thereby identified.

If $H_2O$ is not present in the measurement gas introduced through the gas inlet 10, $H_2O$ is naturally not decomposed in the first chamber 20, and thus $H_2$ is not introduced into the second chamber 40, so that the water vapor detection current Ip1 is approximately zero.

$H_2$ is oxidized to generate $H_2O$, so that the measurement gas contains $H_2O$ and CO and substantially does not contain $CO_2$ and oxygen. The measurement gas is introduced into the third chamber 61. In the third chamber 61, oxygen is pumped in by operation of the second measurement pump cell 41, and CO contained in the introduced measurement gas is oxidized.

Pumping-in of Oxygen is performed in the way that the second measurement pump cell control part 122*b* of the controller 110 sets a target value (control voltage) of the electromotive force V2 in the third chamber sensor cell 82 to a value in a range of 100 mV to 300 mV (preferably 200 mV) and feedback-controls the voltage Vp2 applied from the variable power supply 46 to the second measurement pump cell 41 in accordance with a difference between an actual value and the target value of the electromotive force V2 so that the electromotive force V2 is maintained at the target value.

The second measurement pump cell 41 operates in this manner, so that an oxidation (a combustion) reaction $2CO+O_2 \rightarrow 2CO_2$ is facilitated, and $CO_2$ in an amount correlating with the amount of $CO_2$ introduced through the gas inlet 10 is generated again in the third chamber 61.

The target value of the electromotive force V2 is set to the value in the range of 100 mV to 300 mV, so that oxygen partial pressure in the third chamber 61 is maintained at a value in a range in which almost all CO is oxidized. It is approximately $10^{-4}$ atm when an equation V2=200 mV holds true, for example.

In this case, the oxygen pump current Ip2 (hereinafter also referred to as a carbon dioxide detection current Ip2) flowing through the second measurement pump cell 41 is substantially proportional to the concentration of $CO_2$ generated by combustion of CO in the third chamber 61 (there is a linear relationship between the carbon dioxide detection current Ip2 and the concentration of generated $CO_2$). The amount of $CO_2$ generated by combustion correlates with the amount of $CO_2$ in the measurement gas decomposed once in the first chamber 20 after being introduced through the gas inlet 10. Accordingly, it can be said that sensing of $CO_2$ in the measurement gas is implemented with detection of the carbon dioxide detection current Ip2 by the second measurement pump cell control part 122*b*. The third chamber 61 is thus also referred to as a second measurement chamber.

There is a linear relationship between the carbon dioxide detection current Ip2 and the concentration of carbon dioxide in the measurement gas. Data (carbon dioxide characteristics data) indicating the linear relationship is identified in advance using model gases having known carbon dioxide concentrations and is held in the carbon dioxide concentration identification part 130C. In the gas sensor 100 according to the present embodiment, the carbon dioxide concentration identification part 130C acquires the value of the carbon dioxide detection current Ip2 detected by the second measurement pump cell control part 122*b*. The carbon dioxide concentration identification part 130C identifies a value of a concentration of carbon dioxide corresponding to the acquired carbon dioxide detection current Ip2 with reference to the carbon dioxide characteristics data. The concentration of carbon dioxide in the measurement gas is thereby identified.

If $CO_2$ is not present in the measurement gas introduced through the gas inlet 10, $CO_2$ is naturally not decomposed in the first chamber 20, and thus CO is not introduced into the third chamber 61, so that the carbon dioxide detection current Ip2 is approximately zero.

Operation of the gas sensor 100 as described above based on FIG. 3 is hereinafter also referred to as basic operation.

Furthermore, in the gas sensor 100 according to the present embodiment, a concentration of oxygen contained in the measurement gas can be acquired, albeit indirectly. Generally, the following difference value between a concentration of oxygen pumped out from the first chamber 20 (C0) and a concentration of oxygen pumped into the second chamber 40 and the third chamber 61 (respectively C1 and C2) corresponds to a concentration of oxygen in the measurement gas introduced through the gas inlet 10.

$$C = C0 - C1 - C2 \quad (1)$$

C0, C1, and C2 are values respectively substantially proportional to the oxygen pump currents Ip0, Ip1, and Ip2, and, in the gas sensor 100, relationships between C0 and Ip0, C1 and Ip1, and C2 and Ip2 (constants of proportionality) are identified in advance and stored in the oxygen concentration identification part 130A. Upon the start of measurement of the measurement gas, the oxygen concentration identification part 130A acquires detected values of the oxygen pump currents Ip0, Ip1, and Ip2 respectively from the adjustment pump cell control part 121, the first measurement pump cell control part 122*a*, and the second measurement pump cell control part 122*b* and acquires the concentration of oxygen in the measurement gas based on the detected values, the above-mentioned constants of proportionality, and the equation (1).

<Concentration Identification Considering Continued Use>

Figure 4:
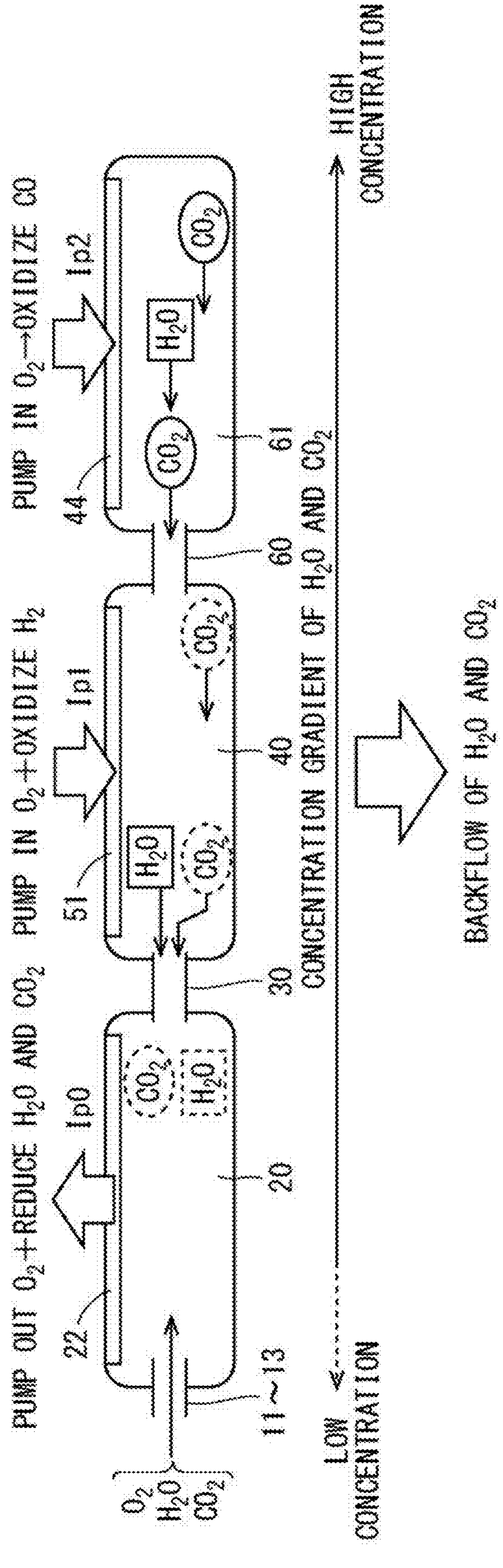
FIG. 4 is a diagram for describing a failure occurring when the gas sensor 100 continuously performs measurement based on basic operation.
Figure 5:
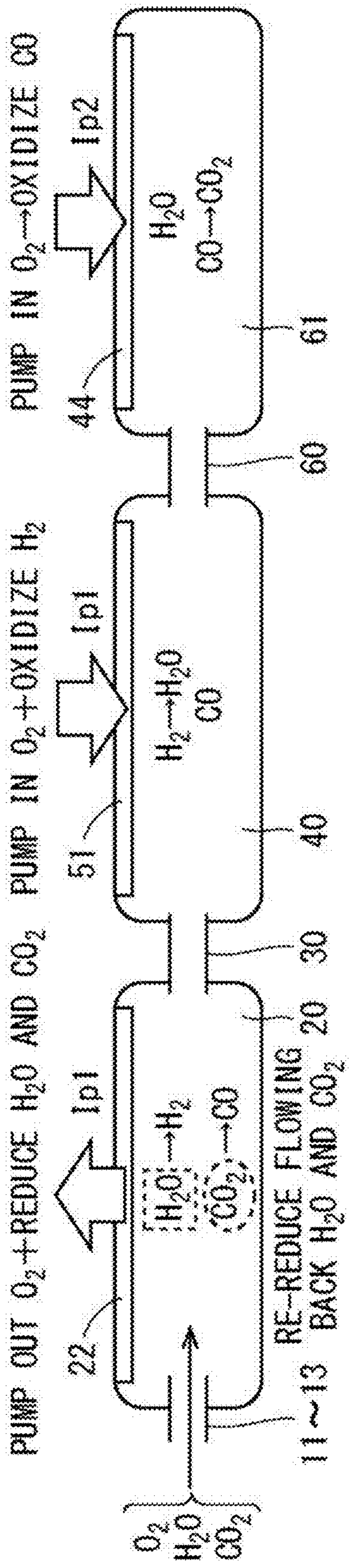
FIG. 5 is a diagram for describing the failure occurring when the gas sensor 100 continuously performs measurement based on the basic operation.

FIGS. 4 and 5 are diagrams for each describing a failure occurring when the gas sensor 100 continuously performs measurement based on the above-mentioned basic operation.

When the gas sensor 100 measures the concentrations of $H_2O$ and $CO_2$ and further the concentration of oxygen in the measurement gas in accordance with the above-mentioned basic operation, $H_2O$ generated in the second chamber 40 is basically introduced into the third chamber 61 or resides in the second chamber 40. $CO_2$ generated in the third chamber 61 basically resides in the third chamber 61. The amount of generated $H_2O$ and $CO_2$ in the second chamber 40 and the third chamber 61 thus increases as measurement is continuously performed.

When the measurement gas newly introduced through the first diffusion control part 11 (gas inlet 10) has a relatively low concentration, a concentration gradient can be formed so that the concentrations of $H_2O$ and $CO_2$ increase toward the third chamber 61 as a farthermost internal space from the gas inlet 10 in the gas distribution part extending from the gas inlet 10 to the third chamber 61 as illustrated in FIG. 4.

As a result of formation of such a concentration gradient, $H_2O$ and $CO_2$ present in the third chamber 61 or the second chamber 40 can diffuse from the third chamber 61 and the second chamber 40 to the first chamber 20. That is to say, $H_2O$ and $CO_2$ can flow back to the first chamber 20.

As described above, in the first chamber 20, pumping-out of oxygen and further reduction of $H_2O$ and $CO_2$ are continuously performed by operation of the adjustment pump cell 21. Thus, as illustrated in FIG. 5, when $H_2O$ and $CO_2$ flow back from the third chamber 61 and the second chamber 40, they are reduced (re-reduced) to generate $H_2$ and CO without being distinguished from $H_2O$ and $CO_2$ as original measurement targets at the time contained in the measurement gas introduced through the gas inlet 10.

Once such re-reduction occurs, $H_2$ being to be oxidized by the first measurement pump cell 50 pumping oxygen into the second chamber 40 includes $H_2$ generated by re-reduction, and CO being to be oxidized by the second measurement pump cell 41 pumping oxygen into the third chamber 61 includes CO generated by re-reduction, so that currents resulting from re-reduced $H_2O$ and $CO_2$ are superimposed onto the water vapor detection current Ip1 flowing through the first measurement pump cell 50 and the carbon dioxide detection current Ip2 flowing through the second measurement pump cell 41. That is to say, the values of the water vapor detection current Ip1 and the carbon dioxide detection current Ip2 no longer correspond to the concentrations of $H_2O$ and $CO_2$ originally contained in the measurement gas, resulting in reduction in measurement accuracy.

In the gas sensor 100 according to the present embodiment, operation of each pump cell is controlled so that such reduction in measurement accuracy attributable to the backflow of $H_2O$ and $CO_2$ does not occur. Generally, the backflow of $H_2O$ and $CO_2$ generated in the second chamber 40 and the third chamber 61 is not suppressed, but operation to emit $H_2O$ and $CO_2$ flowing back to the first chamber 20 outside the sensor element 101 is performed to secure measurement accuracy. This operation is also referred to as generated gas emission operation.

Figure 6A:
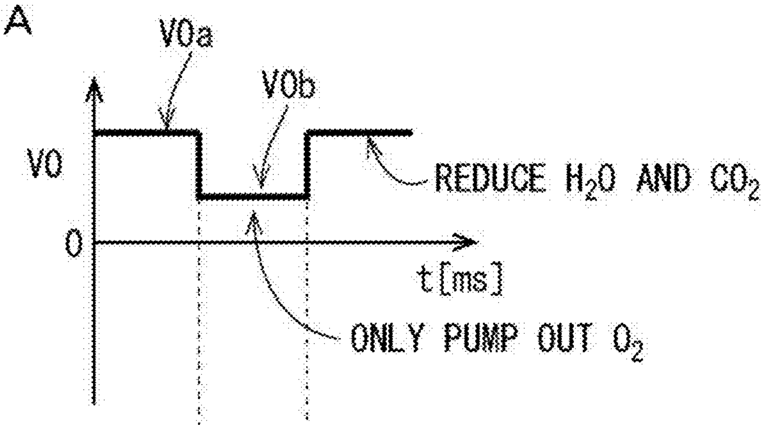
FIGS. 6A and 6B are diagrams showing changes in target values of electromotive forces V0, V1, and V2 over time in generated gas emission operation.
Figure 6B:
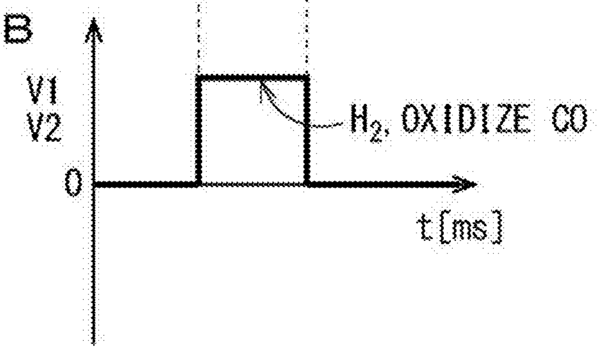
Figure 7:
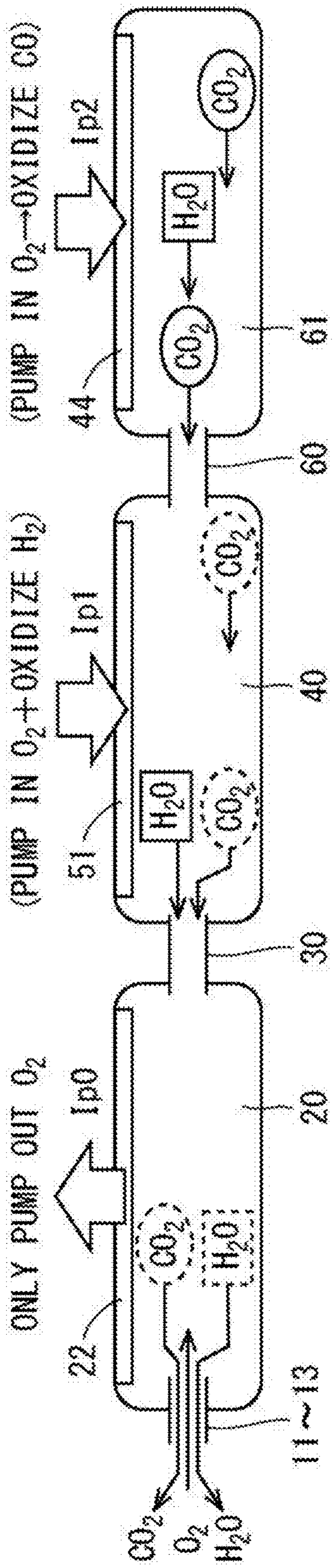
FIG. 7 is a schematic diagram illustrating entry and exit of gases into and from three chambers during the generated gas emission operation.

FIGS. 6A and 6B are diagrams showing changes in target values of the electromotive forces V0, V1, and V2 over time in the generated gas emission operation. FIG. 7 is a schematic diagram illustrating entry and exit of gases into and from the three chambers (internal spaces) during the generated gas emission operation.

As described above, in the basic operation, the target value of the electromotive force V0 in the first chamber sensor cell 80 is set to the value in the range of 1000 mV to 1500 mV, and feedback control is performed on the voltage Vp0 applied to the adjustment pump cell 21 so that the electromotive force V0 is maintained at the target value.

In contrast, in the generated gas emission operation, the target value (set value) of the electromotive force V0 in the first chamber sensor cell 80 is temporarily changed from a steady-state value as a value V0*a* to a value V0*b* at any timing as shown in FIG. 6A.

The value V0*a* is herein the value in the range of 1000 mV to 1500 mV as with the target value of the electromotive force V0 in the basic operation. The value V0*a* may be set to the same value as the target value of the electromotive force V0 in the basic operation.

While the target value of the electromotive force V0 is set to the value V0*a*, the adjustment pump cell 21 pumps out oxygen from the first chamber 20 so that substantially all $H_2O$ and $CO_2$ contained in the measurement gas are reduced as in the basic operation.

In contrast, the value V0*b* is a value smaller than the value V0*a* and in a range of 400 mV to 700 mV (preferably 400 mV).

When the target value of the electromotive force V0 is set to the value V0*b*, the adjustment pump cell 21 pumps out oxygen present in the first chamber 20 to the extent that $H_2O$ and $CO_2$ contained in the measurement gas are not reduced. That is to say, reduction of $H_2O$ and $CO_2$ in the first chamber 20 is temporarily interrupted while operation of the adjustment pump cell 21 as an oxygen pumping-out means is maintained. In this case, the oxygen partial pressure in the first chamber 20 is maintained at a sufficiently low value to the extent that $H_2O$ and $CO_2$ contained in the measurement gas are not reduced. It is approximately $10^{-8}$ atm when an equation V0=400 mV holds true, for example.

That is to say, in the generated gas emission operation, the adjustment pump cell 21 performs, in the middle of pumping-out operation (first pumping-out operation) to pump out oxygen from the first chamber 20 so that substantially all water vapor and carbon dioxide contained in the measurement gas are reduced, pumping-out operation (second pumping-out operation) to pump out oxygen from the first chamber 20 to the extent that water vapor and carbon dioxide contained in the measurement gas introduced into the first chamber 20 are not reduced.

On the other hand, the target values of the electromotive force V1 and the electromotive force V2 are set similarly to those in the basic operation. Specifically, the target value of the electromotive force V1 is set to the value in the range of 250 mV to 450 mV (preferably 350 mV), and the target value of the electromotive force V2 is set to the value in the range of 100 mV to 300 mV (preferably 200 mV).

In this case, while operation of the gas sensor 100 when the target value of the electromotive force V0 is set to the value V0*a* is the same as the basic operation, only oxygen contained in the measurement gas introduced into the first chamber 20 is pumped out, and $H_2O$ and $CO_2$ are not reduced when the target value of the electromotive force V0 is set to the value V0*b*. Thus, even when a concentration gradient as illustrated in FIG. 4 is formed, and $H_2O$ and $CO_2$ flow back to the first chamber 20 as a result of residing of $H_2O$ and $CO_2$ generated in the second chamber 40 and the third chamber 61, flowing back $H_2O$ and $CO_2$ are emitted outside the element as they are without being re-reduced in the first chamber 20 as illustrated in FIG. 7. The concentration gradient is thereby reduced, and, as a result, re-reduction of flowing back $H_2O$ and $CO_2$ when and after the target value of the electromotive force V0 is set to the value V0*a* again is less likely to occur. That is to say, in the gas sensor 100 according to the present embodiment, the second pumping-out operation is started, so that $H_2O$ and $CO_2$ generated by selective oxidation of $H_2$ and CO are suitably emitted outside the element through the first chamber 20 in accordance with the concentration gradient formed in the gas distribution part in the sensor element 101.

The second pumping-out operation may be performed at any timing or may be performed at a predetermined timing. Alternatively, it may be performed when a predetermined condition is met. For example, the second pumping-out operation may be performed based on integral values of measured values of $H_2O$ and $CO_2$ because the amount of $H_2O$ and $CO_2$ generated in the second chamber 40 and the third chamber 61 increases as the measured values are continuously large in the gas sensor 100.

A time period that the target value of the electromotive force V0 is set to the value V0*b* and the second pumping-out operation is performed is preferably in a range of 1 ms to 1 s. A set time of less than 1 ms is not preferable because diffusion of $H_2O$ and $CO_2$ from the second chamber 40 or the third chamber 61 does not sufficiently progress, so that the concentration gradient is not sufficiently reduced, and the measurement accuracy might still continuously be reduced. A set time of more than 1 s is not preferable because $H_2O$ and $CO_2$ contained in the newly introduced measurement gas cannot be reduced for a long time period, that is, concentrations cannot be measured for a long time to reduce responsiveness.

Alternatively, the target value of the electromotive force V0 may periodically be changed so that the adjustment pump cell 21 alternately and periodically performs the first pumping-out operation and the second pumping-out operation to periodically make a temporal stop of reduction of $H_2O$ and $CO_2$, and, the target values (set values) of the electromotive force V1 in the second chamber sensor cell 81 and the electromotive force V2 in the third chamber sensor cell 82 may also periodically be changed in synchronization with the periodic change in target value of the electromotive force V0 as shown in FIG. 6B. That is to say, the first measurement pump cell 50 and the second measurement pump cell 41 may pump in oxygen in synchronization with the second pumping-out operation.

The target values of the electromotive force V1 and the electromotive force V2 are each set to zero when the target value of the electromotive force V0 is set to the value V0*a* and are each set to a value in the same range as that in the basic operation only when the target value of the electromotive force V0 is set to the value V0*b*. In this case, the first measurement pump cell 50 and the second measurement pump cell 41 operate only when the adjustment pump cell 21 performs the second pumping-out operation and do not operate when the adjustment pump cell 21 performs the first pumping-out operation. The electromotive force V1 and the electromotive force V2 are actually set to different values while they are indicated by one graph for ease of illustration in FIG. 6B.

In this case, reduction of $H_2O$ and $CO_2$ in the first chamber 20 and selective oxidation of $H_2$ and CO respectively in the second chamber 40 and the third chamber 61 are performed at different timings. That is to say, while $H_2$ and CO are re-oxidized in the second chamber 40 and the third chamber 61, only oxygen contained in the introduced measurement gas is pumped out, and $H_2O$ and $CO_2$ are not reduced in the first chamber 20. Also in this case, even when $H_2O$ and $CO_2$ generated in the second chamber 40 and the third chamber 61 reside, and a concentration gradient as illustrated in FIG. 4 is formed, $H_2O$ and $CO_2$ flowing back to the first chamber 20 are emitted outside the element as they are without being re-reduced in the first chamber 20.

In this case, the time period that the target value of the electromotive force V0 is set to the value V0*a* is also preferably in the range of 1 ms to 1 s.

Figure 8A:
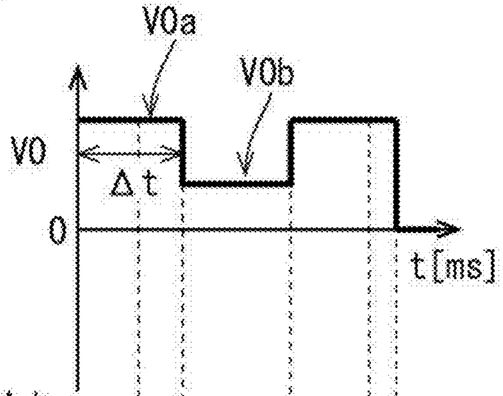
FIGS. 8A and 8B are diagrams showing yet another example of the generated gas emission operation.
Figure 8B:
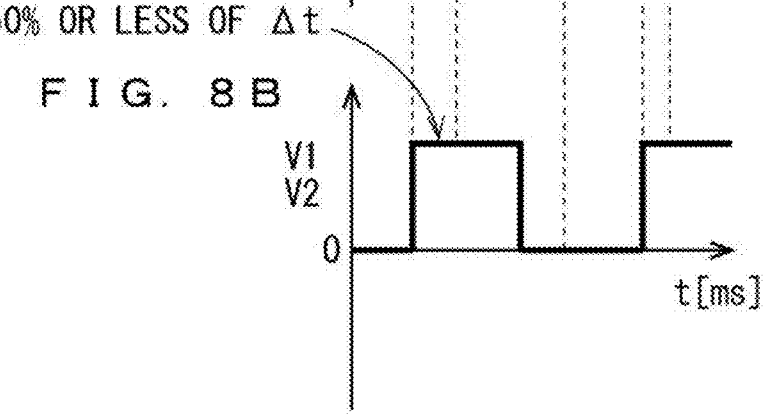

FIGS. 8A and 8B are diagrams showing yet another example of the generated gas emission operation. In this case, while a periodic change in target value of the electromotive force V0 is similar to that in a case of FIG. 6A as shown in FIG. 8A, a phase (timing) of a periodic change in target values of the electromotive force V1 and the electromotive force V2 is shifted from that in a case of FIG. 6B as shown in FIG. 8B. More specifically, pumping of oxygen into the second chamber 40 and the third chamber 61 starts early during the first pumping-in operation and ends during the second pumping-in operation. A degree of advancement in start time, however, is 50% or less of a time period for which the first pumping-in operation is performed (a time period for which the target value of the electromotive force V0 is set to the value V0*a*) Δt.

As described above, according to the present embodiment, in the gas sensor that performs pumping-in of oxygen contained in the measurement gas and reduction of $H_2O$ and $CO_2$ in the first chamber, oxidizes $H_2$ and CO generated by reduction respectively in the second chamber and the third chamber, and acquires the concentrations of $H_2O$ and $CO_2$ contained in the measurement gas based on the magnitudes of the oxygen pump currents generated by pumping-in in the second chamber and the third chamber during oxidation, reduction of $H_2O$ and $CO_2$ in the first chamber is temporarily or periodically stopped to emit $H_2O$ and $CO_2$ generated by oxidation of $H_2$ and CO outside the sensor element from the first chamber using the concentration gradient thereof. Reduction in measurement accuracy attributable to re-reduction of $H_2O$ and $CO_2$ generated by oxidation of $H_2$ and CO is suitably suppressed.

<Modifications>

In the above-mentioned embodiment, generated gas emission operation to emit $H_2O$ and $CO_2$ generated by oxidation of $H_2$ and CO generated by reduction of $H_2O$ and $CO_2$ contained in the measurement gas for concentration measurement in the gas sensor 100 including the sensor element 101 having a three chamber structure is targeted. A process to reduction of $H_2O$ and $CO_2$ contained in the measurement gas to generate $H_2$ and CO, however, may not necessarily be performed only in one chamber. The sensor element may have another structure as long as generated gas emission operation similar to that in the above-mentioned embodiment can be performed.

What is claimed is:

1. A gas sensor capable of measuring concentrations of a plurality of sensing target gas components contained in a measurement gas, the measurement gas at least containing water vapor and carbon dioxide, the gas sensor comprising:
- a sensor element having a structure formed of an oxygen-ion conductive solid electrolyte; and
- a controller controlling operation of the gas sensor, wherein
- the sensor element comprises:
  - a gas inlet through which the measurement gas is introduced;
  - a plurality of chambers communicating sequentially from the gas inlet via different diffusion control parts; and
  - a heater heating the sensor element,
- two of the plurality of chambers are a first measurement chamber and a second measurement chamber, the second measurement chamber being one of the plurality of chambers farthest from the gas inlet, the first measurement chamber being a chamber next to the second measurement chamber,
- the sensor element further comprises:
  - an oxygen pumping-out means capable of performing first pumping-out operation to pump out oxygen contained in the measurement gas so that substantially all water vapor and carbon dioxide contained in the measurement gas are reduced before the measurement gas introduced through the gas inlet reaches the first measurement chamber;
  - a first measurement pump cell including a first measurement electrode formed to face the first measurement chamber, an out-of-space pump electrode provided at a location other than a location in the plurality of chambers, and a portion of the solid electrolyte present between the first measurement electrode and the out-of-space pump electrode; and a second measurement pump cell including a second measurement electrode formed to face the second measurement chamber, the out-of-space pump electrode, and a portion of the solid electrolyte present between the second measurement electrode and the out-of-space pump electrode, the first measurement pump cell is capable of pumping oxygen into the first measurement chamber to selectively oxidize, in the first measurement chamber, hydrogen generated by reduction of water vapor associated with the first pumping-out operation and contained in the measurement gas introduced into the first measurement chamber, the second measurement pump cell is capable of pumping oxygen into the second measurement chamber to oxidize, in the second measurement chamber, carbon monoxide generated by reduction of carbon dioxide associated with the first pumping-out operation and contained in the measurement gas introduced into the second measurement chamber, the controller identifies:

a concentration of water vapor contained in the measurement gas based on a magnitude of a current flowing between the first measurement electrode and the out-of-space pump electrode when oxygen is pumped into the first measurement chamber by the first measurement pump cell; and a concentration of carbon dioxide contained in the measurement gas based on a magnitude of a current flowing between the second measurement electrode and the out-of-space pump electrode when oxygen is pumped into the second measurement chamber by the second measurement pump cell, the oxygen pumping-out means is further capable of performing second pumping-out operation for a predetermined time period in the middle of the first pumping-out operation, the second pumping-out operation being operation to pump out oxygen contained in the measurement gas to the extent that water vapor and carbon dioxide contained in the measurement gas before reaching the first measurement chamber are not reduced, and reduction of water vapor and carbon dioxide by the oxygen pumping-out means is interrupted upon start of the second pumping-out operation, so that water vapor generated in the first measurement chamber and carbon dioxide generated in the second measurement chamber are emitted outside the sensor element.

2. The gas sensor according to claim 1, wherein the plurality of chambers include a first chamber, a second chamber as the first measurement chamber, and a third chamber as the second measurement chamber, the sensor element further comprises an adjustment pump cell as the oxygen pumping-out means including an adjustment electrode formed to face the first chamber, the out-of-space pump electrode, and a portion of the solid electrolyte present between the adjustment electrode and the out-of-space pump electrode, the adjustment pump cell is capable of performing, as the first pumping-out operation, operation to pump out oxygen from the first chamber so that substantially all water vapor and carbon dioxide contained in the measurement gas introduced into the first chamber are reduced and performing, as the second pumping-out operation, operation to pump out oxygen from the first chamber to the extent that water vapor and carbon dioxide contained in the measurement gas introduced into the first chamber are not reduced for a predetermined time period in the middle of the first pumping-out operation, and reduction of water vapor and carbon dioxide in the first chamber is interrupted upon start of the second pumping-out operation performed by the adjustment pump cell, so that water vapor generated in the second chamber and carbon dioxide generated in the third chamber are emitted outside the sensor element through the first chamber.

3. The gas sensor according to claim 2, wherein the adjustment pump cell alternately and periodically performs the first pumping-out operation and the second pumping-out operation, and pumping of oxygen into the second chamber by the first measurement pump cell and pumping of oxygen into the third chamber by the second measurement pump cell are performed periodically in accordance with the first pumping-out operation and the second pumping-out operation performed by the adjustment pump cell.

4. The gas sensor according to claim 3, wherein pumping of oxygen into the second chamber by the first measurement pump cell and pumping of oxygen into the third chamber by the second measurement pump cell are performed in synchronization with the second pumping-out operation performed by the adjustment pump cell.

5. The gas sensor according to claim 3, wherein pumping of oxygen into the second chamber by the first measurement pump cell and pumping of oxygen into the third chamber by the second measurement pump cell start during the first pumping-out operation and end during the second pumping-out operation performed by the adjustment pump cell.

6. The gas sensor according to claim 2, wherein the sensor element further comprises:

a reference electrode in contact with a reference gas;

a first chamber sensor cell which includes the adjustment electrode, the reference electrode, and a portion of the solid electrolyte present between the adjustment electrode and the reference electrode and in which electromotive force V0 in accordance with a concentration of oxygen in the first chamber is generated between the adjustment electrode and the reference electrode;

a second chamber sensor cell which includes the first measurement electrode, the reference electrode, and a portion of the solid electrolyte present between the first measurement electrode and the reference electrode and in which electromotive force V1 in accordance with a concentration of oxygen in the second chamber is generated between the first measurement electrode and the reference electrode; and a third chamber sensor cell which includes the second measurement electrode, the reference electrode, and a portion of the solid electrolyte present between the second measurement electrode and the reference electrode and in which electromotive force V2 in accordance with a concentration of oxygen in the third chamber is generated between the second measurement electrode and the reference electrode, and the controller controls:

a voltage applied across the adjustment electrode and the out-of-space pump electrode by the adjustment pump cell so that the electromotive force V0 in the first chamber sensor cell is maintained at a predetermined target value in a range of 1000 mV to 1500 mV during the first pumping-out operation and is maintained at a predetermined target value in a range of 400 mV to 700 mV during the second pumping-out operation;

a voltage applied across the first measurement electrode and the out-of-space pump electrode by the first measurement pump cell so that the electromotive force V1 in the second chamber sensor cell is maintained at a predetermined target value in a range of 250 mV to 450 mV; and a voltage applied across the second measurement electrode and the out-of-space pump electrode by the second measurement pump cell so that the electromotive force V2 in the third chamber sensor cell is maintained at a predetermined target value in a range of 100 mV to 300 mV.

7. A concentration measurement method of measuring concentrations of a plurality of sensing target gas components contained in a measurement gas using a gas sensor, the measurement gas at least containing water vapor and carbon dioxide, wherein the gas sensor includes a sensor element having a structure formed of an oxygen-ion conductive solid electrolyte, the sensor element comprises:

a gas inlet through which the measurement gas is introduced;

a plurality of chambers communicating sequentially from the gas inlet via different diffusion control parts; and a heater heating the sensor element, two of the plurality of chambers are a first measurement chamber and a second measurement chamber, the second measurement chamber being one of the plurality of chambers farthest from the gas inlet, the first measurement chamber being a chamber next to the second measurement chamber, the sensor element further comprises:

an oxygen pumping-out means capable of performing first pumping-out operation to pump out oxygen contained in the measurement gas so that substantially all water vapor and carbon dioxide contained in the measurement gas are reduced before the measurement gas introduced through the gas inlet reaches the first measurement chamber;

a first measurement pump cell including a first measurement electrode formed to face the first measurement chamber, an out-of-space pump electrode provided at a location other than a location in the plurality of chambers, and a portion of the solid electrolyte present between the first measurement electrode and the out-of-space pump electrode; and a second measurement pump cell including a second measurement electrode formed to face the second measurement chamber, the out-of-space pump electrode, and a portion of the solid electrolyte present between the second measurement electrode and the out-of-space pump electrode, the concentration measurement method using the gas sensor comprises:

a) performing the first pumping-out operation using the oxygen pumping-out means;

b) pumping, using the first measurement pump cell, oxygen into the first measurement chamber to selectively oxidize, in the first measurement chamber, hydrogen generated by reduction of water vapor associated with the first pumping-out operation and contained in the measurement gas introduced into the first measurement chamber;

c) pumping, using the second measurement pump cell, oxygen into the second measurement chamber to oxidize, in the second measurement chamber, carbon monoxide generated by reduction of carbon dioxide associated with the first pumping-out operation and contained in the measurement gas introduced into the second measurement chamber;

d) identifying a concentration of water vapor contained in the measurement gas based on a magnitude of a current flowing between the first measurement electrode and the out-of-space pump electrode when oxygen is pumped into the first measurement chamber using the first measurement pump cell; and e) identifying a concentration of carbon dioxide contained in the measurement gas based on a magnitude of a current flowing between the second measurement electrode and the out-of-space pump electrode when oxygen is pumped into the second measurement chamber using the second measurement pump cell, the oxygen pumping-out means performs second pumping-out operation to pump out oxygen contained in the measurement gas to the extent that water vapor and carbon dioxide contained in the measurement gas before reaching the first measurement chamber are not reduced for a predetermined time period in the middle of the step a) to interrupt reduction of water vapor and carbon dioxide using the oxygen pumping-out means, so that water vapor generated in the first measurement chamber and carbon dioxide generated in the second measurement chamber are emitted outside the sensor element.

8. The concentration measurement method using the gas sensor according to claim 7, wherein the plurality of chambers include a first chamber, a second chamber as the first measurement chamber, and a third chamber as the second measurement chamber, the sensor element further comprises an adjustment pump cell as the oxygen pumping-out means including an adjustment electrode formed to face the first chamber, the out-of-space pump electrode, and a portion of the solid electrolyte present between the adjustment electrode and the out-of-space pump electrode, in the step a), using the adjustment pump cell, operation to pump out oxygen from the first chamber so that substantially all water vapor and carbon dioxide contained in the measurement gas introduced into the first chamber are reduced is performed as the first pumping-out operation, and operation to pump out oxygen from the first chamber to the extent that water vapor and carbon dioxide contained in the measurement gas introduced into the first chamber are not reduced is performed as the second pumping-out operation for a predetermined time period in the middle of the first pumping-out operation to interrupt reduction of water vapor and carbon dioxide in the first chamber, so that water vapor generated in the second chamber and carbon dioxide generated in the third chamber are emitted outside the sensor element through the first chamber.

9. The concentration measurement method using the gas sensor according to claim 8, wherein in the step a), the first pumping-out operation and the second pumping-out operation are alternately and periodically performed using the adjustment pump cell, and pumping of oxygen into the second chamber using the first measurement pump cell in the step b) and pumping of oxygen into the third chamber using the second measurement pump cell in the step c) are performed periodically in accordance with the first pumping-out operation and the second pumping-out operation performed using the adjustment pump cell in the step a).

10. The concentration measurement method using the gas sensor according to claim 9, wherein pumping of oxygen into the second chamber using the first measurement pump cell in the step b) and pumping of oxygen into the third chamber using the second measurement pump cell in the step c) are performed in synchronization with the second pumping-out operation performed using the adjustment pump cell in the step a).

11. The concentration measurement method using the gas sensor according to claim 9, wherein pumping of oxygen into the second chamber using the first measurement pump cell in the step b) and pumping of oxygen into the third chamber using the second measurement pump cell in the step c) start during the first pumping-out operation and end during the second pumping-out operation performed using the adjustment pump cell in the step a).

12. The concentration measurement method using the gas sensor according to claim 8, wherein the sensor element further comprises a reference electrode in contact with a reference gas, in the step a), a voltage applied across the adjustment electrode and the out-of-space pump electrode using the adjustment pump cell is controlled so that electromotive force V0 generated between the adjustment electrode and the reference electrode in accordance with a concentration of oxygen in the first chamber is maintained at a predetermined target value in a range of 1000 mV to 1500 mV during the first pumping-out operation and is maintained at a predetermined target value in a range of 400 mV to 700 mV during the second pumping-out operation, in the step b), a voltage applied across the first measurement electrode and the out-of-space pump electrode using the first measurement pump cell is controlled so that electromotive force V1 generated between the first measurement electrode and the reference electrode in accordance with a concentration of oxygen in the second chamber is maintained at a predetermined target value in a range of 250 mV to 450 mV, and in the step c), a voltage applied across the second measurement electrode and the out-of-space pump electrode using the second measurement pump cell is controlled so that electromotive force V2 generated between the second measurement electrode and the reference electrode in accordance with a concentration of oxygen in the third chamber is maintained at a predetermined target value in a range of 100 mV to 300 mV.

13. The gas sensor according to claim 3, wherein the sensor element further comprises:

a reference electrode in contact with a reference gas;

a first chamber sensor cell which includes the adjustment electrode, the reference electrode, and a portion of the solid electrolyte present between the adjustment electrode and the reference electrode and in which electromotive force V0 in accordance with a concentration of oxygen in the first chamber is generated between the adjustment electrode and the reference electrode;

a second chamber sensor cell which includes the first measurement electrode, the reference electrode, and a portion of the solid electrolyte present between the first measurement electrode and the reference electrode and in which electromotive force V1 in accordance with a concentration of oxygen in the second chamber is generated between the first measurement electrode and the reference electrode; and a third chamber sensor cell which includes the second measurement electrode, the reference electrode, and a portion of the solid electrolyte present between the second measurement electrode and the reference electrode and in which electromotive force V2 in accordance with a concentration of oxygen in the third chamber is generated between the second measurement electrode and the reference electrode, and the controller controls:

a voltage applied across the adjustment electrode and the out-of-space pump electrode by the adjustment pump cell so that the electromotive force V0 in the first chamber sensor cell is maintained at a predetermined target value in a range of 1000 mV to 1500 mV during the first pumping-out operation and is maintained at a predetermined target value in a range of 400 mV to 700 mV during the second pumping-out operation;

a voltage applied across the first measurement electrode and the out-of-space pump electrode by the first measurement pump cell so that the electromotive force V1 in the second chamber sensor cell is maintained at a predetermined target value in a range of 250 mV to 450 mV; and a voltage applied across the second measurement electrode and the out-of-space pump electrode by the second measurement pump cell so that the electromotive force V2 in the third chamber sensor cell is maintained at a predetermined target value in a range of 100 mV to 300 mV.

14. The gas sensor according to claim 4, wherein the sensor element further comprises:

a reference electrode in contact with a reference gas;

a first chamber sensor cell which includes the adjustment electrode, the reference electrode, and a portion of the solid electrolyte present between the adjustment electrode and the reference electrode and in which electromotive force V0 in accordance with a concentration of oxygen in the first chamber is generated between the adjustment electrode and the reference electrode;

a second chamber sensor cell which includes the first measurement electrode, the reference electrode, and a portion of the solid electrolyte present between the first measurement electrode and the reference electrode and in which electromotive force V1 in accordance with a concentration of oxygen in the second chamber is generated between the first measurement electrode and the reference electrode; and a third chamber sensor cell which includes the second measurement electrode, the reference electrode, and a portion of the solid electrolyte present between the second measurement electrode and the reference electrode and in which electromotive force V2 in accordance with a concentration of oxygen in the third chamber is generated between the second measurement electrode and the reference electrode, and the controller controls:

a voltage applied across the adjustment electrode and the out-of-space pump electrode by the adjustment pump cell so that the electromotive force V0 in the first chamber sensor cell is maintained at a predetermined target value in a range of 1000 mV to 1500 mV during the first pumping-out operation and is maintained at a predetermined target value in a range of 400 mV to 700 mV during the second pumping-out operation;

a voltage applied across the first measurement electrode and the out-of-space pump electrode by the first measurement pump cell so that the electromotive force V1 in the second chamber sensor cell is maintained at a predetermined target value in a range of 250 mV to 450 mV; and a voltage applied across the second measurement electrode and the out-of-space pump electrode by the second measurement pump cell so that the electromotive force V2 in the third chamber sensor cell is maintained at a predetermined target value in a range of 100 mV to 300 mV.

15. The gas sensor according to claim 5, wherein the sensor element further comprises:

a reference electrode in contact with a reference gas;

a first chamber sensor cell which includes the adjustment electrode, the reference electrode, and a portion of the solid electrolyte present between the adjustment electrode and the reference electrode and in which electromotive force V0 in accordance with a concentration of oxygen in the first chamber is generated between the adjustment electrode and the reference electrode;

a second chamber sensor cell which includes the first measurement electrode, the reference electrode, and a portion of the solid electrolyte present between the first measurement electrode and the reference electrode and in which electromotive force V1 in accordance with a concentration of oxygen in the second chamber is generated between the first measurement electrode and the reference electrode; and a third chamber sensor cell which includes the second measurement electrode, the reference electrode, and a portion of the solid electrolyte present between the second measurement electrode and the reference electrode and in which electromotive force V2 in accordance with a concentration of oxygen in the third chamber is generated between the second measurement electrode and the reference electrode, and the controller controls:

a voltage applied across the adjustment electrode and the out-of-space pump electrode by the adjustment pump cell so that the electromotive force V0 in the first chamber sensor cell is maintained at a predetermined target value in a range of 1000 mV to 1500 mV during the first pumping-out operation and is maintained at a predetermined target value in a range of 400 mV to 700 mV during the second pumping-out operation;

a voltage applied across the first measurement electrode and the out-of-space pump electrode by the first measurement pump cell so that the electromotive force V1 in the second chamber sensor cell is maintained at a predetermined target value in a range of 250 mV to 450 mV; and a voltage applied across the second measurement electrode and the out-of-space pump electrode by the second measurement pump cell so that the electromotive force V2 in the third chamber sensor cell is maintained at a predetermined target value in a range of 100 mV to 300 mV.

16. The concentration measurement method using the gas sensor according to claim 9, wherein the sensor element further comprises a reference electrode in contact with a reference gas, in the step a), a voltage applied across the adjustment electrode and the out-of-space pump electrode using the adjustment pump cell is controlled so that electromotive force V0 generated between the adjustment electrode and the reference electrode in accordance with a concentration of oxygen in the first chamber is maintained at a predetermined target value in a range of 1000 mV to 1500 mV during the first pumping-out operation and is maintained at a predetermined target value in a range of 400 mV to 700 mV during the second pumping-out operation, in the step b), a voltage applied across the first measurement electrode and the out-of-space pump electrode using the first measurement pump cell is controlled so that electromotive force V1 generated between the first measurement electrode and the reference electrode in accordance with a concentration of oxygen in the second chamber is maintained at a predetermined target value in a range of 250 mV to 450 mV, and in the step c), a voltage applied across the second measurement electrode and the out-of-space pump electrode using the second measurement pump cell is controlled so that electromotive force V2 generated between the second measurement electrode and the reference electrode in accordance with a concentration of oxygen in the third chamber is maintained at a predetermined target value in a range of 100 mV to 300 mV.

17. The concentration measurement method using the gas sensor according to claim 10, wherein the sensor element further comprises a reference electrode in contact with a reference gas, in the step a), a voltage applied across the adjustment electrode and the out-of-space pump electrode using the adjustment pump cell is controlled so that electromotive force V0 generated between the adjustment electrode and the reference electrode in accordance with a concentration of oxygen in the first chamber is maintained at a predetermined target value in a range of 1000 mV to 1500 mV during the first pumping-out operation and is maintained at a predetermined target value in a range of 400 mV to 700 mV during the second pumping-out operation, in the step b), a voltage applied across the first measurement electrode and the out-of-space pump electrode using the first measurement pump cell is controlled so that electromotive force V1 generated between the first measurement electrode and the reference electrode in accordance with a concentration of oxygen in the second chamber is maintained at a predetermined target value in a range of 250 mV to 450 mV, and in the step c), a voltage applied across the second measurement electrode and the out-of-space pump electrode using the second measurement pump cell is controlled so that electromotive force V2 generated between the second measurement electrode and the reference electrode in accordance with a concentration of oxygen in the third chamber is maintained at a predetermined target value in a range of 100 mV to 300 mV.

18. The concentration measurement method using the gas sensor according to claim 11, wherein the sensor element further comprises a reference electrode in contact with a reference gas, in the step a), a voltage applied across the adjustment electrode and the out-of-space pump electrode using the adjustment pump cell is controlled so that electromotive force V0 generated between the adjustment electrode and the reference electrode in accordance with a concentration of oxygen in the first chamber is maintained at a predetermined target value in a range of 1000 mV to 1500 mV during the first pumping-out operation and is maintained at a predetermined target value in a range of 400 mV to 700 mV during the second pumping-out operation, in the step b), a voltage applied across the first measurement electrode and the out-of-space pump electrode using the first measurement pump cell is controlled so that electromotive force V1 generated between the first measurement electrode and the reference electrode in accordance with a concentration of oxygen in the second chamber is maintained at a predetermined target value in a range of 250 mV to 450 mV, and in the step c), a voltage applied across the second measurement electrode and the out-of-space pump electrode using the second measurement pump cell is controlled so that electromotive force V2 generated between the second measurement electrode and the reference electrode in accordance with a concentration of oxygen in the third chamber is maintained at a predetermined target value in a range of 100 mV to 300 mV.

* * * * *